United States Patent [19]

Heger

[11] Patent Number: 4,623,090

[45] Date of Patent: Nov. 18, 1986

[54] AUTOMATIC INTERIOR AIR TEMPERATURE CONTROL APPARATUS WITH A DUAL PURPOSE FAN FOR USE WITH TEMPERATURE CONTROL SYSTEMS IN MOTOR VEHICLES

[75] Inventor: Siegfried Heger, Wuerzburg, Fed. Rep. of Germany

[73] Assignee: Siemens Aktiengesellschaft, Munich and Berlin, Fed. Rep. of Germany

[21] Appl. No.: 712,800

[22] Filed: Mar. 18, 1985

[30] Foreign Application Priority Data

Mar. 19, 1984 [DE] Fed. Rep. of Germany ....... 3410019

[51] Int. Cl.$^4$ .............................................. F24F 7/06
[52] U.S. Cl. .............................. 236/49; 236/DIG. 19
[58] Field of Search ........................ 236/49, DIG. 19; 415/116

[56] References Cited

U.S. PATENT DOCUMENTS

| | | | |
|---|---|---|---|
| 3,743,180 | 7/1973 | Perkins et al. | 236/49 X |
| 4,141,496 | 2/1979 | Ducheck | 236/DIG. 19 |
| 4,236,443 | 12/1980 | Schossow | 415/116 X |
| 4,245,780 | 1/1981 | Franz | 236/49 X |
| 4,445,637 | 5/1984 | Hedrick | 98/103 X |

FOREIGN PATENT DOCUMENTS 2507700 12/1982 France .
19447 2/1977 Japan ......................... 236/DIG. 19

Primary Examiner—William E. Tapolcai
Attorney, Agent, or Firm—F. W. Powers; J. L. James

[57] ABSTRACT

A simple and space-saving, nevertheless effective and low-noise apparatus for the interior compartment air of a motor vehicle, to impact a temperature sensor of an automatic heating or air-conditioning system is provided. This invention achieves these results by providing, in place of a separate auxiliary fan, an auxiliary air current drawn from the interior compartment and sensing the temperature of that current with a sensor. The impeller of the fan used for circulation in the interior compartment is also equipped with supplemental blades outside its actual main air current to generate an auxiliary air current which is drawn through a separate air channel from the interior compartment passing over the sensor. This air channel, such as a flexible hose, is suitably mounted between the air discharge opening on the dashboard and an air-feed opening in the spiral housing backwall of the fan. This apparatus is particularly suitable for application in the actual value detection of the interior compartment air temperature in a motor vehicle with an automatic heating or air-conditioning system.

4 Claims, 1 Drawing Figure

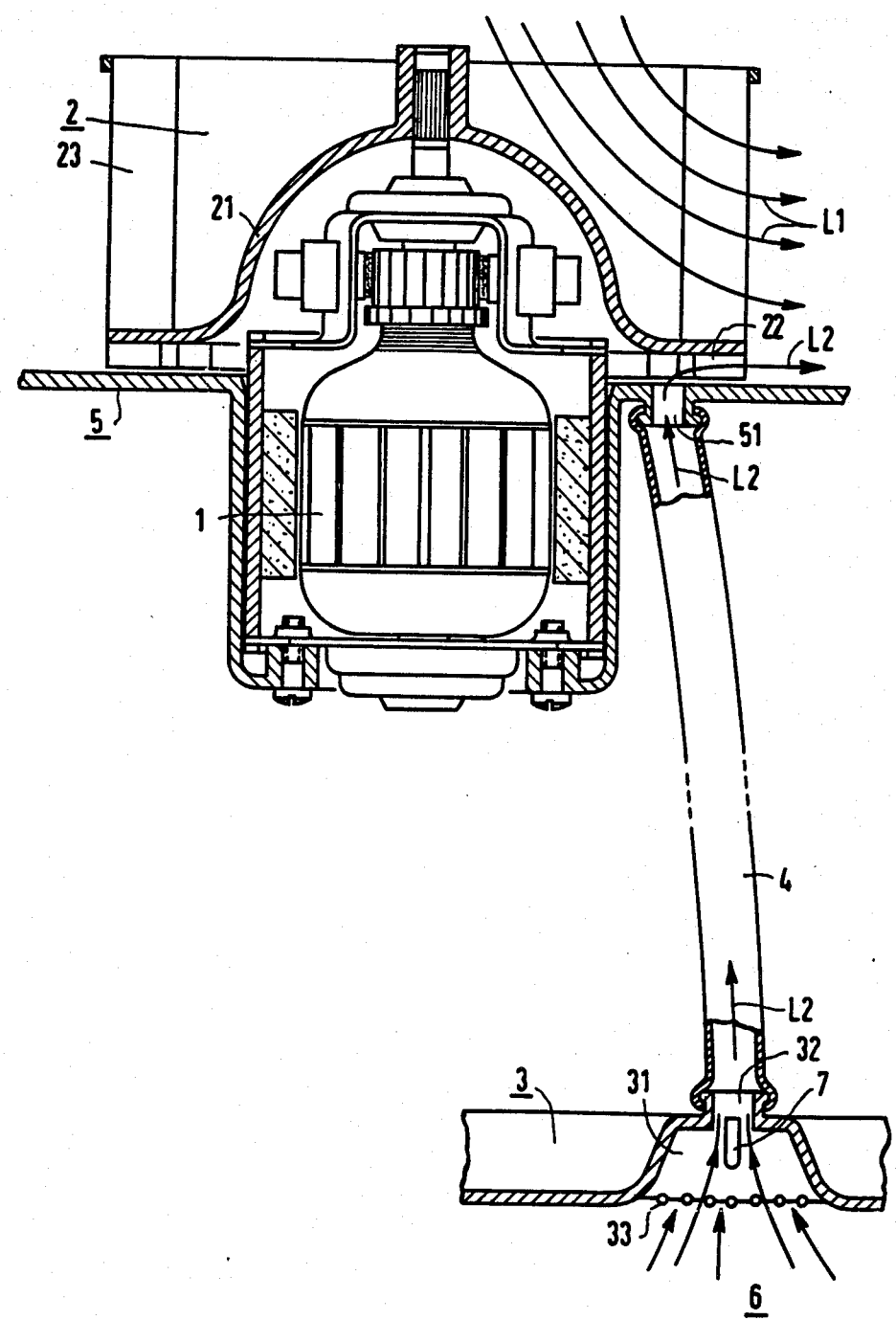

AUTOMATIC INTERIOR AIR TEMPERATURE CONTROL APPARATUS WITH A DUAL PURPOSE FAN FOR USE WITH TEMPERATURE CONTROL SYSTEMS IN MOTOR VEHICLES

BACKGROUND OF THE INVENTION

This invention relates to the field of heating and/or air-conditioning temperature control systems and more particularly to the automatic interior air temperature control of such systems for use in motor vehicles.

A known temperature control for automatic heating or air-conditioning systems presently available on the market has, besides the main air circulation fan, a separate small additional fan, mounted behind a motor vehicle dashboard outside of the interior compartment. This additional fan is installed solely for the determination of the respective actual value of the interior compartment air temperature. Through an opening in the dashboard, this additional fan draws in a small portion of the interior compartment air which thereby passes over a sensor located in the airstream behind the dashboard. The sensor is temperature-regulated in accordance with the interior temperature and thereby provides the relevant parameter value for controlling the automatic heating or air-conditioning system. Accordingly, it will be appreciated that it would be highly desirable to provide the control apparatus with a dual purpose fan such that an additional fan is unnecessary to provide the interior air temperature sensor.

The object of this invention is to provide a simpler, more compact design to supply interior air to the temperature sensor in an automatic heating or air-conditioning system. It is a further object of this invention to provide an effective, low-noise design to supply interior air to the temperature sensor of a heating or air-conditioning system.

SUMMARY OF THE INVENTION

Briefly stated, in accordance with one aspect of the invention, the foregoing objects are achieved by providing an automatic interior compartment temperature control apparatus suitable for use as a temperature control for a heating or air-conditioning system wherein air is conveyed from the interior compartment of the vehicle by an auxiliary air current into a sensor compartment where the temperature of the air is sensed by a sensor. The auxiliary air current is provided by an auxiliary fan arrangement upon the main air circulation fan by having auxiliary blades draw air from the interior compartment through a special air channel.

In the design according to this invention, the preferably single-flow radial fan basically found in every vehicular heating or air-conditioning system, even those not automatically controllable to a present interior compartment air temperature, can be utilized in a simple fashion by a slight design modification for the purpose of drawing in an auxiliary air stream from the interior compartment of the motor vehicle to pass over the temperature sensor, avoiding the need for a separate auxiliary fan with a motor of its own. This particularly simple design configuration provides for the additional blades to draw the auxiliary air flow, being arranged on the impeller along the outer radial portion beneath the hub dome and the air duct for the auxiliary air flow emptying into an air feed opening in the spiral housing back wall of the main fan.

In another aspect of the invention, the auxiliary blades are suitably formed by axially extended ends of the main air circulation blades beyond the impeller hub dome.

BRIEF DESCRIPTION OF THE DRAWING

While the specification concludes with claims particularly pointing out and distinctly claiming the subject matter which is regarded as the invention, it is believed that the invention will be better understood from the following description of the preferred embodiment taken in conjunction with the accompanying drawing in which:

FIG. 1 is a diagrammatic cross section of the automatic interior compartment temperature control apparatus.

DETAILED DESCRIPTION OF THE INVENTION

In schematic depiction, the design example shows the longitudinal section of a permanent-magnet d.c. motor 1, on whose upper rotor shaft end a closed hub dome 21 of an impeller 2 is mounted by which a main air flow L1 is conveyed into the interior compartment of a motor vehicle in a fashion not further detailed in this illustration. The impeller 2 of the single-flow radial fan provided for here is surrounded in a normal fashion by a spiral housing shown only partially in cross-section, with a spiral housing backwall 5. Said fan to convey a main air current to ventilate the interior compartment of a motor vehicle is generally mounted outside the passenger compartment in the vicinity of the dashboard.

For automatic temperature control, the temperature and, as required, the quantity of the conveyed air, are automatically set as a function of various actual value parameters by means of a preferably electronic control mechanism in accordance with controllable set values. To detect the actual value of the respective temperature of the interior compartment, a sensor compartment 31 with a temperature sensor 7 is installed in the dashboard, protected by a grate 33 from the interior compartment 6; from an air-discharge opening 32 of the sensor compartment 3 an auxiliary air current L2 is drawn off, which impacts the temperature sensor 7 mounted in the sensor compartment 31; thereupon, the temperature sensor 7 transmits an actual value corresponding to the interior compartment temperature to an electronic control device which is not further detailed in this schematic.

To draw off the auxiliary air current L2 from the interior compartment, the impeller 2, of the fan designed to ventilate the interior compartment in accordance with this invention, contains additional blades 22 beneath the closed hub dome 21, in addition to the blades for the main air current L1, along its radial outer edge. By means of these additional, also known as auxiliary blades 22, the auxiliary air current L2 can be drawn through an air channel formed by a flexible hose 4 from the interior compartment 6 via the sensor compartment and the temperature sensor 7 enclosed therein. For that purpose, flexible hose 4 empties with its one lower end into the air-feed opening 32 of sensor compartment 31 and with its other upper end into an air-feed opening 51 designed radially inside before the auxiliary blades 22 in the spiral housing backwall 25. For very simple manufacture and assembly, the flexible hose 4 can be sleeve-fitted and tightened down to the air-discharge opening 32 or the air-feed opening 51, by means of properly cut-out edges. By a further modification of the design for an additional simplification of manufacture, the auxiliary blades 22 are formed by axially extended ends of the blades 23 of the impeller 2 used to convey the actual main-air current L1 for ventilating the interior compartment; these blade ends extend axially downwards above the hub dome 21.

It will now be understood that there has been disclosed an improved apparatus and arrangement for the temperature control of heating or air-conditioning system for the interior compartment of a motor vehicle.

As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

What is claimed as new and desired to be secured by Letters Patent of the United States is:

1. For use in temperature control systems for vehicles such as heating or air-conditioning systems, an automatic interior compartment temperature control apparatus, wherein the interior compartment air is conveyed by a fan into the interior compartment of a motor vehicle and can be regulated in accordance with a controllable temperature set value, using a temperature sensor which is impacted in a sensor compartment to detect the respective temperature actual value by an auxiliary air flow drawn off from the interior compartment of the motor vehicle by an auxiliary fan arrangement, said apparatus comprising:

an impeller of the fan having a closed hub dome and a plurality of main air flow blades connected to a top surface of the hub dome providing a main air flow when the impeller is rotated;

a plurality of auxiliary blades afixed to the impeller opposite to the main air flow blades, beneath the closed hub dome, outside the main air flow providing said auxiliary fan arrangement;

said auxiliary air flow drawn from the vehicle by the operation of said auxiliary blades;

a special air channel such as a flexible air hose draws said auxiliary air current over the temperature sensor;

an electric motor connected to the hub dome for rotating the impeller;

said fan is of a radial construction enclosed in a spiral housing with the auxiliary blades located on a radial outer portion thereof; and said special air channel empties into an air inlet opening in a backwall of said spiral housing.

2. An apparatus according to claim 1, wherein the auxiliary blades are formed as extensions of the ends of the impeller blades providing the main air flow, axially beneath the lower surface of the hub dome.

3. An apparatus according to claim 1, wherein the sensor compartment is installed in a dashboard of a motor vehicle; and a flexible hose forms the air channel from the sensor compartment to the fan.

4. An apparatus according to claim 2, wherein the sensor compartment is installed in a dashboard of a motor vehicle; and a flexible hose forms the air channel from the sensor compartment to the fan.

* * * * *